Figure 1:
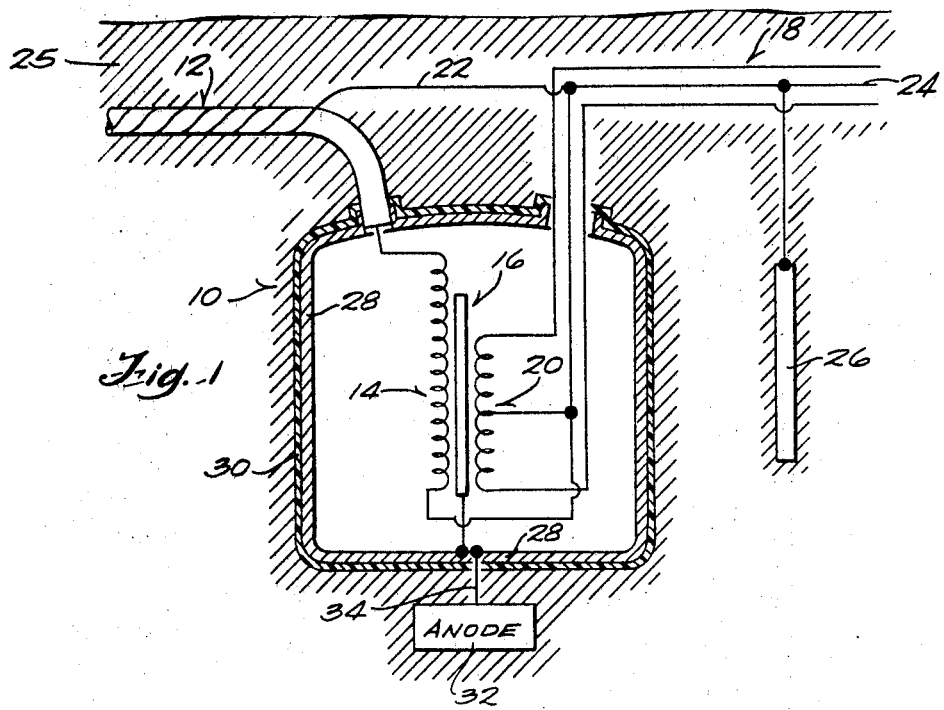

United States Patent

[11] 3,578,982

| [72] | Inventor | Rolland D. Nelson<br>Waukesha, Wis. |
|---|---|---|
| [21] | Appl. No. | 748,798 |
| [22] | Filed | July 30, 1968 |
| [45] | Patented | May 18, 1971 |
| [73] | Assignee | RTE Corporation<br>Waukesha, Wis. |

[54] CORROSION PROTECTION FOR METAL ENCLOSURES FOR ELECTRICAL EQUIPMENT
6 Claims, 2 Drawing Figs.

[52] U.S. Cl. .................................................. 307/95, 204/196
[51] Int. Cl. ................................................... H01b 7/28
[50] Field of Search ....................................... 307/95; 204/147, 196; 174/37 (Inquired); 336/(Inquired)

[56] References Cited
UNITED STATES PATENTS

| 2,459,123 | 1/1949 | Bates et al. ................... | 307/95X |
| 3,143,670 | 8/1964 | Husook ......................... | 307/95 |
| 3,361,660 | 1/1968 | Chittum et al. ............... | 204/196X |
| 3,405,283 | 10/1968 | Leonard ........................ | 307/95 |

FOREIGN PATENTS

| 641,022 | 8/1950 | Great Britain................ | 307/95 |

Primary Examiner—Robert K. Schaefer
Assistant Examiner—H. J. Hohauser
Attorneys—Ronald E. Barry and James E. Nilles ABSTRACT: Disclosed herein is a metallic enclosure for electrical equipment used in an underground electrical distribution system which is isolated from the electrical distribution system ground and made cathodic by connecting the enclosure to a consumable anode buried in the ground in close proximity to the metallic enclosure.

Patented May 18, 1971 3,578,982

Inventor
Rolland D. Nelson
By
Whulu, Whulu, House & Clemency
Attorneys

CORROSION PROTECTION FOR METAL ENCLOSURES FOR ELECTRICAL EQUIPMENT

BACKGROUND OF THE INVENTION

Underground electrical distribution systems commonly have the electrical equipment positioned within a metal enclosure or casing below ground level. The primary neutral of the transformer and the casing are commonly connected to a copper ground rod buried in the ground in a spaced relation to the enclosure. The enclosure generally includes a metal tank which may or may not be covered by an outer protective coating and may be filled with a dielectric fluid. The copper ground rod and any exposed metal surface of the tank form an electric cell due to the ground connection between the tank and the ground rod. Since the metal of the tank is higher in the displacement series than the copper in the ground rod, the tank forms the anode and corrosion of any exposed surfaces of the tank will be accelerated due to electrolytic erosion.

SUMMARY OF THE INVENTION

In the present invention an apparatus is disclosed to provide protection from electrolytic erosion for metallic enclosures which are used to house electrical equipment, such as transformers, for electrical distribution systems. More specifically, the apparatus comprises a metal enclosure in the form of a metal tank not directly connected to the electrical distribution ground rod and electrically connected to a consummable metal plate buried in the ground in close proximity to the tank. The metal plate is made anodic by forming the plate of a metal higher in the displacement series than the metal of the tank, or the plate may be connected to a source of electrical potential to bias the plate positive relative to the tank. In either instance, the plate becomes an anode and the tank becomes a cathode.

Figure 2:
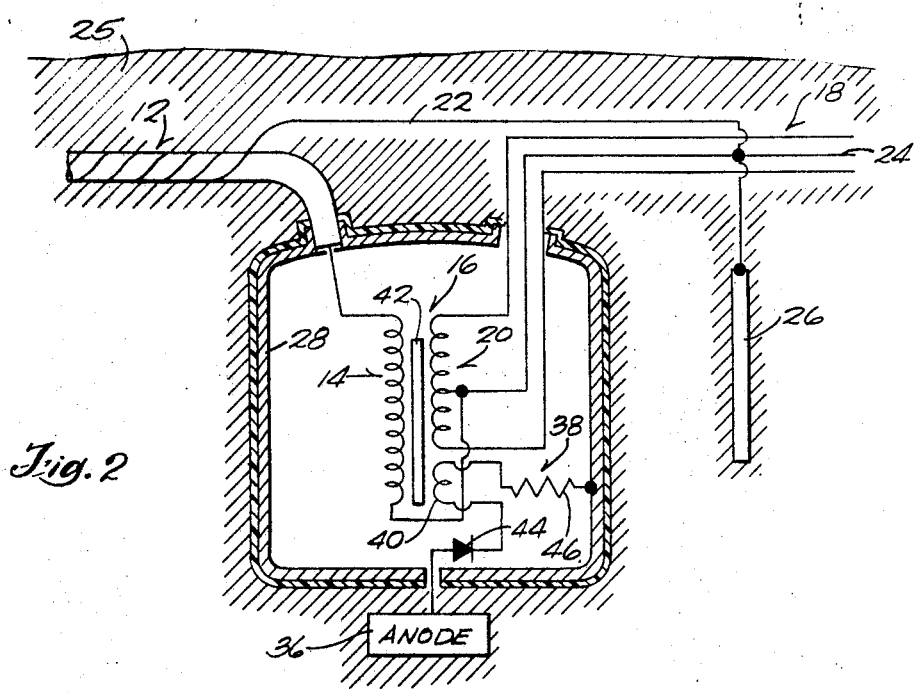

Other objects and advantages of the present invention will become more apparent when read in connection with the accompanying drawings in which:

FIG. 1 is a diagrammatic view of a distribution system having an underground casing with a consummable anode connected to the transformer casing; and FIG. 2 is a diagrammatic view of an underground transformer casing for an electrical distribution system having a consummable anode connected to a source of electrical potential.

DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The apparatus of the present invention provides protection from electrolytic erosion for an underground metal enclosure 10 by making the enclosure cathodic relative to a metal plate 32 buried in the ground in close proximity to the enclosure 10. The enclosure 10 generally includes a metal tank 28 generally made of a ferrous material such as stainless steel which may be provided with a protective coating 30 of polyvinyl chloride or the like to prevent attack by the corrosive agencies present in the ground 25. The plate 32 is electrically connected to the tank 28 and is biased positive relative to the metal tank to form an anode with the metal tank 28 forming the cathode. Electron flow will then occur from the plate 32 toward the metal of the tank 28.

The enclosure 10 is used to protect underground electrical equipment for an electrical distribution system. In the drawings, the electrical equipment is shown as a transformer 16 having a high voltage cable 12 connected to the primary 14 of the transformer 16 and a service cable 18 connected to the secondary 20 of the transformer 16. The metal tank 28 is isolated from the electrical distribution system by connecting the concentric neutral 22 of the high voltage cable 12 to the neutral 24 of the service cable 18 which is connected to a copper ground rod 26 buried in the ground 25 in a spaced relation to the tank 28. Corrosion of any exposed areas of the surface of the tank is minimized by means of the consummable metal plate 32 connected to the tank 28 by the electrical conductor 34.

More particularly, in the embodiment of the invention shown in FIG. 1, the tank 28 is made of a ferrous metal such as stainless steel with a protective coating 30 of polyvinyl chloride provided on the outer surface of the tank. The consummable plate 32 is formed of a metal higher in the displacement or electromotive series than the ferrous metal of the tank 28 and is connected to the tank by means of an insulated electrical conductor 34. Aluminum, zinc and magnesium can be used for the plate 32 and are all higher in the displacement series than the ferrous metal used to make the tank 28. An electric cell is formed between the consummable plate 32 and the exposed portion of the metal tank 28. Electron flow in the electric cell will occur from the anode or plate 32 to the tank or cathode 28. If the tank 28 is made of a material other than a ferrous metal, the plate material should be changed accordingly to a material higher in the displacement series.

In the embodiment shown in FIG. 2, the tank 28 is also made of a ferrous metal such as stainless steel and is protected from attack by corrosive agencies in the ground by a protective coating 30 made of polyvinyl chloride bonded to the outer surface of the tank 28. Corrosion of exposed areas of the tank 28 due to defects in the coating 30 is prevented by means of an anode plate 36 made of stainless steel or carbon. The anode plate 36 is biased positive by means of an electric circuit 38 connected between the plate 36 and the tank 28. The circuit 38 includes a coil 40 positioned adjacent the transformer core 42 with a rectifier 44 and a high resistance 46 connected in the circuit 38 to provide a low current to the plate 36. The circuit 38 provides a low voltage potential difference between the plate 36 and the tank 28 with the plate 36 being biased positive (anodic) relative to the tank (cathodic). The electric cell formed in the ground between the tank 28 and plate 36 will prevent electrolytic erosion by assuring electron flow from the plate to the tank.

In an alternate form of the invention, the tank 28 of FIG. 2 can also be made cathodic relative to the ground rod 26 to prevent electrolytic erosion without using a consummable anode. This can be accomplished by connecting the circuit 38 of FIG. 2 directly to the neutral 24 inside the transformer instead of to the anode 36. The rectifier 44 in the circuit will provide a negative bias to the tank so that it becomes cathodic relative to the copper ground rod 26.

I claim:

1. Apparatus for protecting electrical equipment in an underground electrical distribution system comprising:
    a metal enclosure adapted to be placed in the ground and isolated from the distribution system;
    an anode electrically connected to said enclosure; and
    means providing a potential difference between said enclosure and anode to establish an anodic relationship between said anode and enclosure.

2. Apparatus according to claim 1 wherein said means for providing a potential difference comprises:
    forming said anode from a metal higher in the electromotive series than the metal of said enclosure.

3. Apparatus according to claim 1 wherein said plate is formed of stainless steel.

4. In an electrical distribution system having an underground transformer grounded by a copper ground rod buried in a spaced relation to the transformer, means for protecting said transformer comprising:
    a metal enclosure surrounding the transformer and isolated therefrom;
    means anodic with respect to said enclosure; and
    circuit means connecting said anodic means to said enclosure.

5. In an electrical distribution system according to claim 4 wherein said anodic means comprises:

a metal plate formed from a material higher in the electromotive series than the metal of said enclosure.

6. In an electrical distribution system according to claim 5 wherein the material for said metal plate is selected from the group consisting of aluminum, zinc and magnesium and said enclosure is formed from a ferrous metal.